United States Patent [19]

Ampulski et al.

[11] Patent Number: 4,495,617
[45] Date of Patent: Jan. 22, 1985

[54] SIGNAL GENERATION AND SYNCHRONIZING CIRCUIT FOR A DECENTRALIZED RING NETWORK

[75] Inventors: Joseph W. Ampulski, Mount Prospect; James N. Furukawa, Chicago, both of Ill.; Donald R. Kesner; Ronald D. Bernal, both of Phoenix, Ariz.

[73] Assignee: A.B. Dick Company, Chicago, Ill.

[21] Appl. No.: 416,312

[22] Filed: Sep. 9, 1982

[51] Int. Cl.³ .............................................. H04J 3/00
[52] U.S. Cl. ................................. 370/86; 340/825.05; 370/89
[58] Field of Search ................ 370/86, 89; 340/825.05

[56] References Cited

U.S. PATENT DOCUMENTS

| | | | |
|---|---|---|---|
| 3,456,242 | 7/1969 | Lubkin et al. | 340/172.5 |
| 4,293,948 | 10/1981 | Soderblom | 370/90 |
| 4,320,515 | 3/1982 | Burton, Jr. | 375/4 |
| 4,320,517 | 3/1982 | Godard et al. | 375/13 |
| 4,417,242 | 11/1983 | Bapst et al. | 370/86 |

OTHER PUBLICATIONS

"Synchronous Data Link Controller"; Western Digital Corporation; Apr. 1981, pp. 99–114.
"Clocking in the Ring"; Submitted to IEEE Project 802 on Apr. 27, 1981; M. R. Patel.

Primary Examiner—Douglas W. Olms
Assistant Examiner—Frank M. Scutch, III
Attorney, Agent, or Firm—McDougall, Hersh & Scott

[57] ABSTRACT

A circuit for signal generation and synchronization is disclosed for a ring network in which a number of stations communicate with each other. The circuit, which is provided at each station in the ring, includes a phase locked loop which loosely couples the transmit and receive clocks of each station during a repeater mode of operation. During a transmit mode the receive and transmit clocks are de-coupled so that phase delay around the ring does not degrade the transmit clock each time a transmission is initiated. The circuit includes logic gates for detecting the transmission of a token, means for generating a token and means for jam syncing the transmit and receive clocks to detect transistions in the incoming data during the repeater mode and after a token has been generated at the end of the transmit mode.

11 Claims, 8 Drawing Figures

SIGNAL GENERATION AND SYNCHRONIZING CIRCUIT FOR A DECENTRALIZED RING NETWORK

BACKGROUND OF THE INVENTION

This invention relates to networks for interconnecting computers, word processors and other devices. Such networks can be divided into two major categories: long haul network, such as the well known ARPA network, and in house networks which operate within a restricted area, such as a building or factory. The latter type is sometimes referred to as a local area network and is the environment of the present invention.

In general, there are three basic topologies for such networks. These are the star, the bus and the ring. The star network is common in computer and communication configurations. The central node of the star may be a computer with many terminals or other peripheral devices connected to it. Another use of the star network is a PBX telephone system.

The bus topology is characterized by a single medium or communication line to which various terminals are connected through a small spur. Bus topology is also common in computer and telecommunication networks. Ring topology is characterized by the interconnection of stations in a ring. Such an arrangement is common in process instrumentation and control and is currently gaining popularity for communication networks for computers, word processors, etc.

The media or cables that can be used for interconnecting stations in a network are chosen based, in part, upon the topology selected. The choices include twisted pair cable, co-axial cable, twin-axial cable and fiber optic cables. Ring topologies can use any of these cables depending upon the size of the ring and the data transmission frequency involved.

In order for terminals in a ring to communicate with each other, it is necessary to have a protocol often referred to by those skilled in the art as a link level protocol. Many such protocols exist but in the field of local area networks two are particularly important: CSMA-CD and Token Passing.

CSMA-CD (carrier sense multiple access—collision detection) is a link level protocol employed by Xerox Corporation in its Ethernet network which is based on a bus topology. A station connected to a CSMA-CD bus broadcasts a packet of information to all other stations on the bus. The header of the packet contains a destination address of the station for which the packet is intended. Each other station in the system examines the header to see if the packet is addressed to it. If so, it collects the packet, otherwise it rejects it.

A station wishing to send a packet of information listens to the bus and, if it is idle, i.e., no other station is using the bus, then it transmits its packet. If the bus is in use, it defers its transmission until a later time.

Collisions, that is, more than one station attempting to transmit at the same time, can occur with this system. For example, it takes many microseconds for a signal transmitted at one end of the bus to arrive at the other end. Thus, a station may start its transmission unaware of the same event happening elsewhere on the bus some distance away.

In the CSMA-CD protocol these collisions are detected and transmission is suspended until a later time. The attempt to re-transmit is randomized to minimize the probability of further collisions. At the end of a transmission, sufficient time (round trip time on the bus) is allowed for signals to die away before further transmission is permitted.

As a result, the output band width of the CSMA-CD network is reduced due to idle time between transmission windows, the loss due to collisions and the loss due to the randomizing delays provided to avoid further collisions. Also significant is the fact that the lost band width is a function of cable length and speed of transmission. The larger that either of these parameters get the greater the loss of band width incurred.

The token passing protocol, which is employed in the system according to the present invention, has as an ojective the elimination of all collisions during normal operation by introducing a defined order in which the stations may transmit. In this protocol a station may only transmit when it has received a token and there is only one token in the local network. Therefore, only one station may transmit at a time. When the station holding the token is finished transmitting it passes the token on to the next station in the network. In the case of a ring topology there is a natural next station in the ring and thus the token passing protocol is well suited to this topology.

In a ring topology using a token passing protocol every station acts as a repeater, regenerating the signal and transmitting it on to the next station. There are two problems associated with ring topology, namely, phase jitter due to errors in clocking the data into and out of a station and phase delay caused by transmission line delays, etc., around the ring. A ring network must provide circuitry capable of removing data from the ring after it has served its purpose and also for correcting for phase jitter and phase delay to prevent loss of data or synchronization.

The impetus to solve these problems is the significantly better performance of the token passing protocol. At low utilization of the network or when the number of stations on the network are few, the CSMA-CD protocol has a faster response time than token passing. At higher utilization or when there are many stations on the network, however, token passing is faster than CSMA-CD protocol and can support a higher level of traffic for the same network transmission rate. Furthermore, token passing provides a more predictable service in terms of response time because there is a known upper bound on the time it takes for the token to perform a complete circuit of the ring and thus an upper limit on waiting time. In a CSMA-CD protocol, at high utilization, waiting time is unpredictable because collisions can arise repeatedly.

It is accordingly an object of the present invention to provide a method and apparatus for use in a token passing protocol ring network which can effectively dispose of accummulated phase delay around the ring.

A further object of the invention is to provide a method and apparatus for a ring network which can communicate from station to station without losing data or synchronization due to phase jitter or phase delay.

Another object of the invention is to provide a method and apparatus for communicating between stations in a ring network employing decentralized clocking.

Other objects and advantages of the invention will be apparent from the remaining specification.

OVERVIEW OF THE INVENTION

The invention employs decentralized clocking for a ring network using a token passing protocol. In this scheme a clock is provided in each station in the ring. The clock in each station is used to transmit the data to the next station only. Phase jitter is, therefore, not cumulative and relevant only between the two stations involved in the transmission.

The invention selectively couples and decouples the receive and transmit clocks and performs a jam sync (phase synchronization) of the transmit and receive clocks at appropriate points in the operating cycle. When a station which is transmitting has completed sending a packet of information onto the network it will so indicate by transmitting an end of frame delimiter, such as the eight binary bits 01111110. The station will next generate a token, such as the eight binary bits 01111111, which is passed sequentially to each succeeding station in the ring until it is passed to a station which is prepared to transmit. Such a station will modify the token, for example, by changing the last bit to a zero, rather than passing it on. This is identified by the next station as a beginning of frame delimiter.

This invention provides the benefits of ring topology while solving the phase jitter and residual phase delay clocking problems. When a station is operating as a listener/repeater its receive and transmit clocks are loosely coupled by means of a crystal controlled phase locked loop. This results in long term frequency lock without passing on instantaneous phase jitter. Residual phase delay is defined as the total delay around the loop minus an integer times the clock rate. For example, if the total loop delay=32.3 $\mu$S and the bit clock is 1 MHz, the integer multiple delay is 32, the residual delay is 0.3 $\mu$S.

When a station operates as a transmitter the receive and transmit clocks are completely decoupled allowing the PLL oscillator to run at its fundamental frequency.

The phase delay problem is solved, according to the invention, by having each station, after token generation (transmitting) or token detection (repeating), arm a "jam sync" circuit that causes the transmit and receive clocks to be synchronized to the next incoming data transition and thereby being synchronized together. Thus, "residual" phase delay around the loop is ignored since re-synchronizing occurs at the next transition following the delay. For NRZI encoding this is a received data bit of "0".

After transmitting, a station has its receive and transmit clock locked together due to the jam sync and thereafter acts as a listener/repeater.

Each station down the ring has circuitry to recognize an incoming token and, if it is not prepared to transmit, to perform a jam sync on its own receive and transmit clock upon recognition of the token.

DETAILED DESCRIPTION

Figure 1:
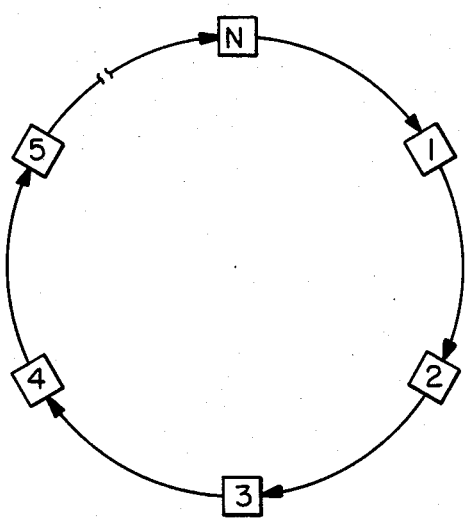
FIG. 1 is a schematic representation of a ring network.

Referring to FIG. 1, a ring network configuration is illustrated. A series of stations numbered 1 through N are interconnected by appropriate media such as coaxial cable, twin lead wire, optical fiber cable or similar technology. Each station may consist of a device, such as a computer terminal, word processing station or other device, which can receive and transmit data over the medium.

The following description will be provided specifically for a ring topology. In addition, the following description will be in connection with the NRZI encoding scheme although it will be understood by those skilled in the art that other coding schemes can be employed in the invention by appropriate modification of the detecting circuits.

Figure 2:
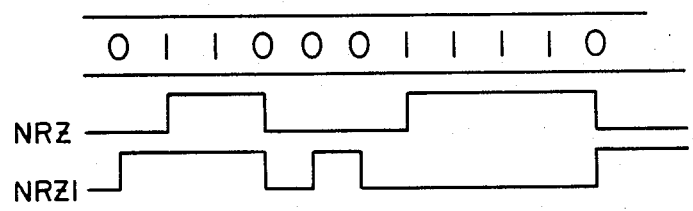
FIG. 2 is a diagram useful in explaining various encoding schemes for transmitting data in the network.

Referring to FIG. 2, there is illustrated digital information on the first line consisting of a plurality of zeros and ones. This is the conventional method of illustrating digital data. In the NRZ encoding scheme zeros are represented by a low while ones are represented by a high.

Beneath the NRZ waveform is a waveform designated NRZI. In this encoding scheme a transition is provided whenever a zero bit is transmitted. No phase transition is provided when a one is transmitted. The advantage of using such an encoding scheme is the significant reduction in frequency of the transmitted bit rate. Using such an encoding scheme it is possible to reduce the frequency to as little as one-fifth of the frequency of the actual bit rate. Of course, a lower frequency permits the use of lower cost media for interconnecting the stations. In the event that a different encoding scheme is employed, the circuitry would be modified to handle that scheme and so the present invention is equally applicable to encoding schemes other than NRZI.

Figure 5:
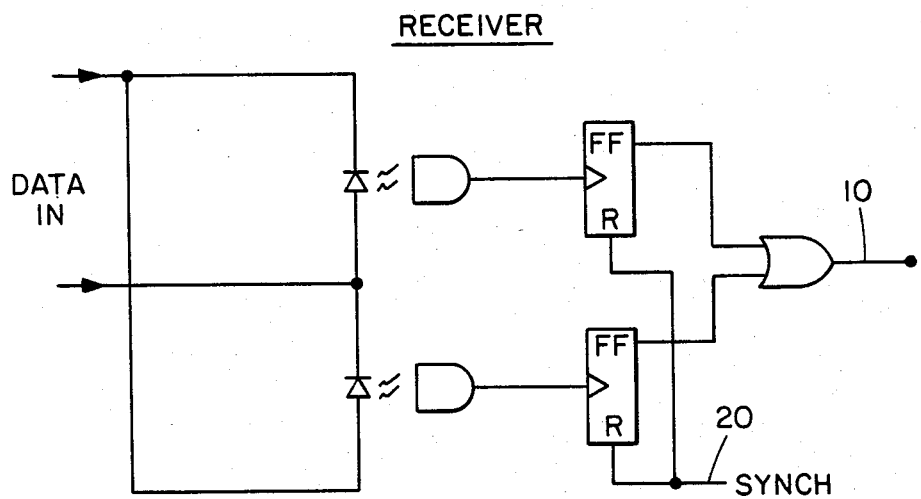
FIG. 5 is a schematic diagram of the receiver portion of the invention.
Figure 3:
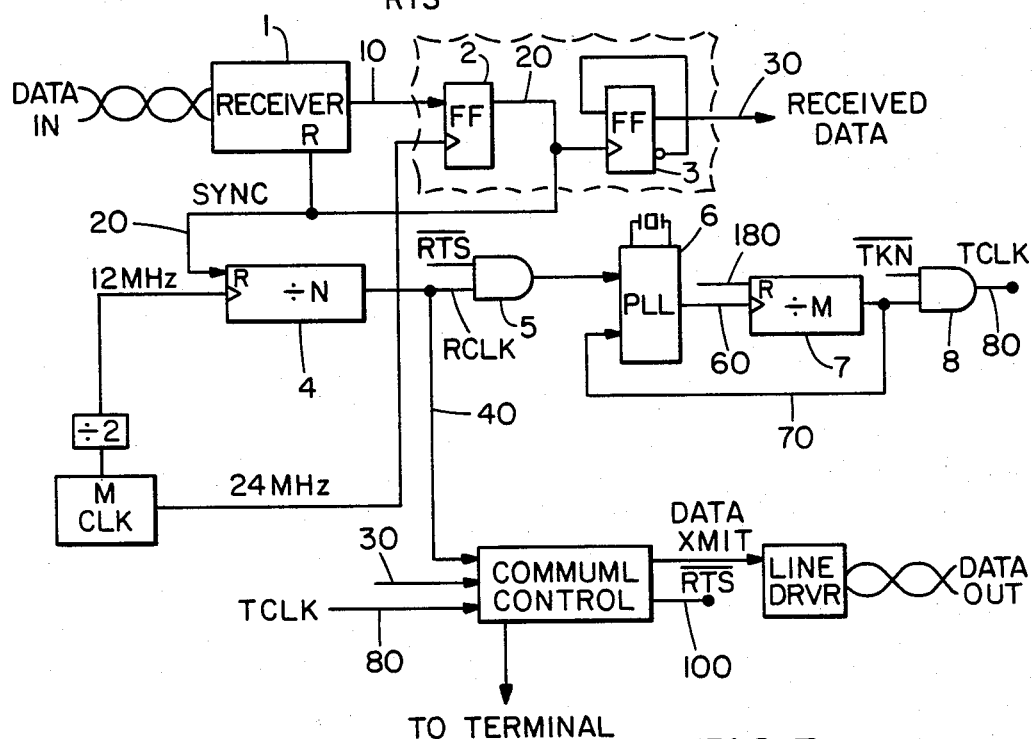

Referring to FIG. 3, a first portion of the invention is illustrated. Data from a previous station in the ring is received by a receiver 1 which, as shown in FIG. 5, includes a "bridge" type circuit coupled via opto isolators to a pair of flipflops, the outputs of which are provided to an OR gate. The data receiver 1 is a transition sensing device which provides a logical 1 signal on line 10 when a data level transition (a zero in the NRZI scheme) is detected.

Data line 10 is provided as an input to a flipflop 2 which is sampled by a high speed clock, M clock, preferably of approximately 24 megahertz. The output of the flipflop on line 20 is a synchronization signal which is fed back to the receiver 1 to reset the flipflop contained therein (see FIG. 5). This, in turn, resets line 10 to a logic 1 and line 20 will be set inactive on the next clocking edge of the 24 megahertz clock. This arrangement guarantees that line 20 will have a minimum active duration time of not less than one clock cycle of the 24 megahertz clock. This is necessary to insure synchronization during reset of various portions of the circuit.

In addition, the synchronizing signal is provided to the reset input of a divide by N counter 4 which is clocked by the master clock via a divide by 2 circuit. Divider 4 preferably divides its clock signal by 12 so that the output therefrom is a 1 megahertz signal on line 40 which hereafter will be referred to as the receive clock. It will be apparent that the receive clock on line 40 is a gated clock reset each time a sync signal on line 20 resets the counter 4.

The sync signal is also provided as the clock input to a flipflop 3 for regenerating the received data in digital form. This data is output on line 30. The received data along with the receive clock are provided as inputs to a communications controller chip of a commercially available type. Such a chip is capable of receiving data, passing it on to a terminal and re-transmitting the data via a differential line driver associated therewith. Such a device is manufactured by a number of companies and, for example, one device suitable for use in the present invention is manufactured by Western Digital Corporation of Newport Beach, Calif. This chip, designated WD1933, is identified in the literature as a synchronous data link controller and a complete description of its circuitry and operation is provided in the literature published therefor which publication, dated April 1981, is hereby incorporated by reference.

For the purposes of the present invention the capabilities of the communications controller may be identified as follows. The received data on line 30 is provided thereto and sent to the local terminal if appropriate. In addition, the received data, in the repeater mode, is transmitted via a differential line driver back onto the communication medium to the next station in the ring. Receipt of the data is controlled by the clock on line 40 while transmission of data from the controller is controlled by a transmit clock from line 80 generated in a manner specified hereafter. The controller produces a signal on line 100 abbreviated as $\overline{RTS}$ which stands for request to send. When the terminal wishes to transmit a packet of data, the $\overline{RTS}$ signal (active low) changes state and this is detected by the circuitry of FIGS. 3 and 4 placing the circuit into the transmit mode as opposed to the receive/repeat mode after a token has been received.

The receive clock on line 40 is gated by AND gate 5 with the $\overline{RTS}$ signal from the communication controller chip. The ouput of the gate 5, is provided as one input to a crystal controlled phase locked loop (PLL) 6 from which a transmit clock is derived.

When the receive clock is permitted to pass gate 5 it is compared by the PLL with the clock produced by the internal crystal oscillator fed back on line 70. This phase comparison is used to slowly modify the output of the PLL to approach the frequency of the receive clock. When the receive clock does not pass gate 5, the output of the PLL is the fundamental frequency of its oscillator.

In either case, the PLL output on line 60 is provided to a divider which divides the output frequency of the PLL down to an appropriate frequency for transmitting. Preferably this will be the approximate same frequency as the receive clock frequency. As indicated, the output of divider 7 on line 70 is fed back to the PLL to permit the phase comparison thereby to loosely couple the output of the PLL to the frequency of the receive clock when the receive clock passes gate 5.

Figure 4:
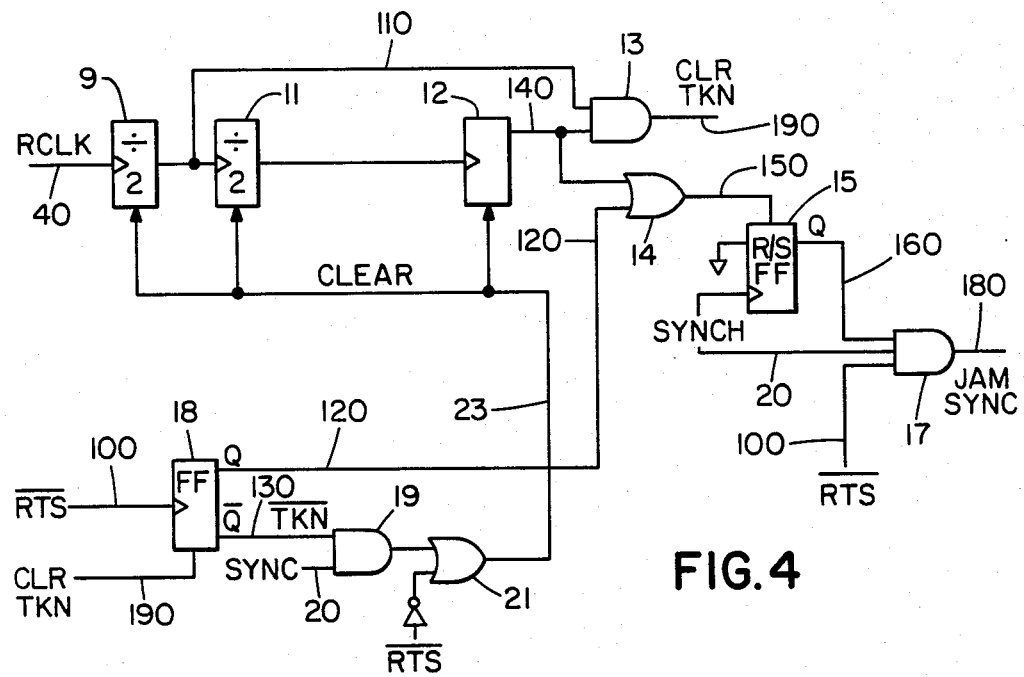
FIGS. 3 and 4 are schematic diagrams of the circuit according to the invention.

The transmit clock on line 70 is gated by AND gate 8 with a signal on line 130 generated by flipflop 18 of FIG. 4. This signal indicates that a token is not being generated for, as will be explained, the transmit clock should not pass gate 8 when a token is being generated.

Summarizing the portion of the circuit thus far described, when a station is prepared to transmit a packet of information onto the ring, the communication controller changes the state of line 100 thereby disabling gate 5 and preventing the receive clock on line 40 from reaching the PLL 6. Since the PLL has no reference it will oscillate at its fundamental frequency as controlled by the crystal. This prevents any shift in phase or frequency due to a change in phase or frequency of the receive clock.

At the end of a transmission a station must generate a token to pass onto the next station in the ring. This is initiated when the communication controller chip deactivates line 100. This initiates generation of the token by a portion of the circuitry illustrated in FIG. 4.

Referring to FIG. 4, the trailing edge of the changing RTS signal on line 100 is used to clock a flipflop 18 having a Q and $\overline{Q}$ outputs connected to lines 120 and 130, respectively. The output on line 130 is used to generate a token by inhibiting the transmit clock on line 80. A token is, of course, a definitional element and its definition can be changed as desired by a circuit designer. For the purpose of understanding the present invention, the token will be defined as a zero followed by seven ones (01111111). In the NRZI coding scheme there would be a transition on the initial zero and no further transition. To generate such a token after the initial zero it is only necessary to inhibit the transmit clock on line 80 by disabling gate 8 after the end of frame delimiter. Thus, line 130 blocks the transmit clock from the communications controller thereby generating a token for the succeeding station. That is, no transitions are transmitted after the initial transition which is interpreted by the next station as 01111111.

Line 130 also inhibits action by gate 19 to prevent clearing of the counter chain. Thus, the counter chain counts through its nine bits (eight plus the extra bit for the residual phase delay) after which gate 13 is enabled to clear the token generation via line 190 and the clear input of flipflop 18. Clearing flipflop 18 sets Q low and $\overline{Q}$ high, again enabling the sync signal input to gate 19 indicating that the token is complete.

At this point the circuit re-enters the repeat mode and seeks to detect the receipt of a token. For that purpose the counter chain is reset every time a sync pulse is received at gate 19 to differentiate between data and tokens.

In addition to generating a token, it is also necessary to detect the receipt of a token in the receive/repeat mode. This is accomplished by the timing chain formed by divide by two counters 9, 11 and 12 and by AND gates 19 and OR gate 21. The timing chain is clocked by the receive clock on line 40 and cleared by the output of gates 19 and 21 to perform the functions of token detection, idle channel detection and timing for token generation as indicated hereafter.

The FIG. 4 circuit performs the token detection function as follows. Note that when a station is not transmitting the output of gate 19, controlled by the sync pulses from line 20, clears the counter chain (counters 9, 11 and 12). Therefore, no output will appear on line 140 until eight counts later. If a token is being received the output will appear since a token consists of the initial transition (zero) followed by seven ones which cause no transition and, therefore, will not reset the counters. Thus, a token is detected if eight receive clock signals on line 40 make their way through the counter chain to output 140. If instead data is being received, the encoding scheme of the communication control chip prevents more than five ones in a row from being transmitted and thus a transition will occur causing the counters to be cleared prior to providing an output on a line 140. Once a token has been detected gate 14 sets a flipflop 15 and arms a gate 17 for the jam sync to be described.

During transmission (line 100 active) the timing chain is held in the initialized state via line 23 due to the RTS input to gate 21. At the completion of the transmission, when line 100 is inactive, the counting chain initiates counting for token generation. Lines 110 and 140 are combined in gate 13 to detect a count of nine which represents the length of the token plus one or two additional bits. The output of gate 13 on line 190 goes active after the token has been transmitted and functions to identify completion of token generation. This output is utilized to clear flipflop 18. When flipflop 18 is cleared the station reverts to the repeater mode.

After transmission and return to the repeater mode a jam sync occurs when the next sync pulse is received while flipflop 15 is set and the station is no longer transmitting. The creation of the jam sync pulse on line 180 resets counter 7, phase syncing the transmit and receive clock to the incoming data transition and to each other.

A significant aspect of the present invention is the jam syncing of the transmit clock and receive clock at specified points of operation. More specifically, after generation of a token and also when a token is detected in the repeater mode, a jam sync is performed. Jam sync control is accomplished by gate 14, flipflop 15 and gate 17. Line 20, the sync signal, is provided as one input to gate 17 and is also used to clock the flipflop 15. The other inputs to gate 17 are the RTS signal and the output of flipflop 15 on line 160. The output of gate 17 on line 180 is supplied to the reset input of divider 7 (FIG. 3). As will be apparent when divider 7 is reset, it effects a jam sync of the transmit clock to the incoming data transition and the receive clock.

A jam sync is generated when either of the inputs to OR gate 14 on lines 120 and 140 set the flipflop 15 on line 150. This occurs either when a token is being generated by virtue of line 120 being active or when a token is detected by virtue of line 140 being active.

Thus, the three conditions for enabling gate 17 are that a sync pulse has occurred, the station is not transmitting and either a token is being generated or has been detected. Subsequently, flipflop 15 is cleared by the trailing edge of a sync signal on the first sync pulse after the end of token generation. This disables gate 17 completing the jam sync operation on divider 7.

Having described the basic components of the circuit according to the invention, the following operating description is provided to insure a complete understanding of the invention.

Receive/Repeat Mode

When a station does not desire to transmit, it remains in the receive/repeat mode and if, in fact, no station on the ring seeks to transmit, all stations will be in the receive/repeat mode. In this mode each station will simply receive the token and pass it on to the next station in the ring. During this time the receive clock on line 40 is loosely coupled to the transmit clock on line 80 via the PLL 6 to deal with one of the two problems indicated in the background portion of the specification, namely, phase jitter.

Phase jitter arises because a sync pulse on line 20 can occur at any point on the 24 megahertz clock waveform since the incoming data is asynchronous with respect to the sampling clock. The PLL detects the phase error and its voltage controlled oscillator slowly changes its output frequency to compensate therefor. This keeps the average error within tolerable limits.

Figure 6:
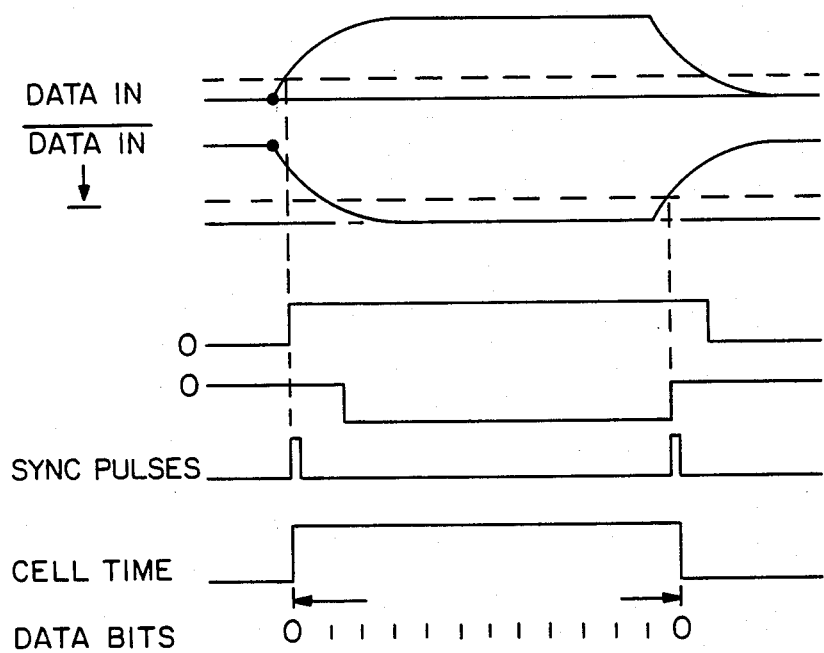
FIG. 6 is a waveform diagram useful in understanding the operation of the receiver portion of the circuit.

With reference to FIG. 6, this aspect of the invention can be clearly understood. Data comes in via the receiver 1, which generates the data waveforms shown in FIG. 6. Sync pulses are generated on the leading and trailing edges of the two waveforms thereby defining a cell time therebetween when data is clocked into the communications chip by the receive clock. If the station is repeating, the clocked in data is re-transmitted by the communications chip at the transmit clock frequency which remains loosely coupled to the receive clock frequency.

If, in fact, no data is being transmitted around the ring, this is conveniently referred to as an idle period. Because the clocks at each station have slightly different frequencies (typically ±0.01%) they can eventually get out of phase with each other to an extent that would be difficult for the PLL circuit alone to compensate for when transmission is resumed. To deal with this problem, and the problem originating from the fact that the various receivers, transmitters and cables in the ring have added an undetermined amount of phase delay to the data, the present invention performs a jam sync on divider 7 whenever a token is received and a station is not prepared to transmit. Thus, the token is a phase delay identifier. This places the receive and transmit clocks exactly into phase with the next incoming data transition after the token.

Thus, in the receive/repeat mode a station will have its clocks loosely coupled. In addition, it will arm the jam sync circuit whenever a token is detected and the station does not wish to transmit.

Transmit Mode

In the transmit mode the communications controller initiates a request to send on line 100 which, as previously described, inhibits the generation of a jam sync at gate 17 and completely decouples the receive clock from the transmit clock via gate 5. Prior to transmission, of course, the transmit token has been received. Transmission is at the fundamental frequency of the PLL oscillator.

When a station finishes transmitting it does a jam sync to re-establish phase relationship with the receive clock. It is this procedure, a significant aspect of the invention, which deals with the second problem inherent in ring systems, accumulated phase delay.

When the transmit clock is jam synced with the receive clock to the next incoming data transition following the token at the end of transmission, the residual phase delay is transmitted following the token. The next station in the ring receives it and, if that station is in the repeat mode (and does not wish to transmit), it too performs a jam sync, as previously described, upon receipt of the token. Thus, the phase delay is passed on from station to station around the ring in a single bit tacked onto the end of the token. This bit can be considered the ninth bit of the token.

The residual phase delay is passed around the loop until it reaches a station that wishes to transmit. At such a station the eight token bits are received, and an active RTS signal is detected. The receive and transmit clocks are decoupled preventing a jam sync and in the process the ninth bit is ignored. This, of course, compensates for the residual phase delay in the ring.

Summarizing, when a station is transmitting, its clocks are decoupled and, therefore, may become out of phase to some extent. Upon completing transmission a station generates and transmits a token (01111111) to the next station. The residual phase delay is contained between the token and the next zero transition to pass through the station. In a system which does not employ a token passing protocol a similar technique can be used solely for the purpose of accumulating identifying phase delay at the completion of transmission.

The phase delay passes from station to station around the ring until encountering a next station which seeks to transmit, at which time the effect of the delay is removed from the ring by the decoupling of that station's clocks. At the end of the token generation interval the residual phase delay is again appended to the token.

From the foregoing it will be appreciated that the present invention provides a method and apparatus for communicating between stations in a ring topology utilizing a decentralized clocking scheme which is capable of accurate data transmission. Phase jitter and phase delay, the two significant problems in such communication, are controlled to prevent erroneous data transmission. Phase jitter is controlled by the loose coupling of the receive and transmit clocks via the PLL circuit in the repeat mode. Accumulated phase delay around the ring is controlled by decoupling the clocks during transmission and thereafter jam syncing the two clocks.

Figure 8:
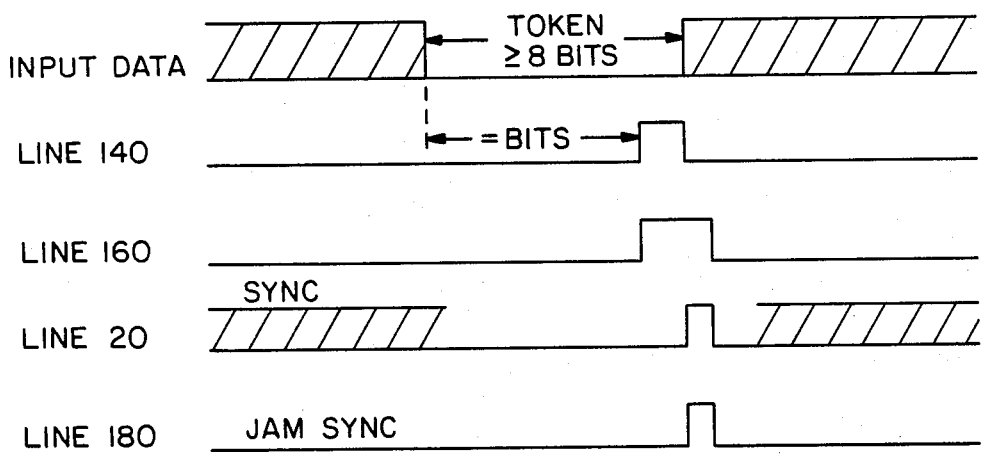
FIG. 8 is a waveform diagram useful in explaining the operation of the circuit in the repeater mode.
Figure 7:
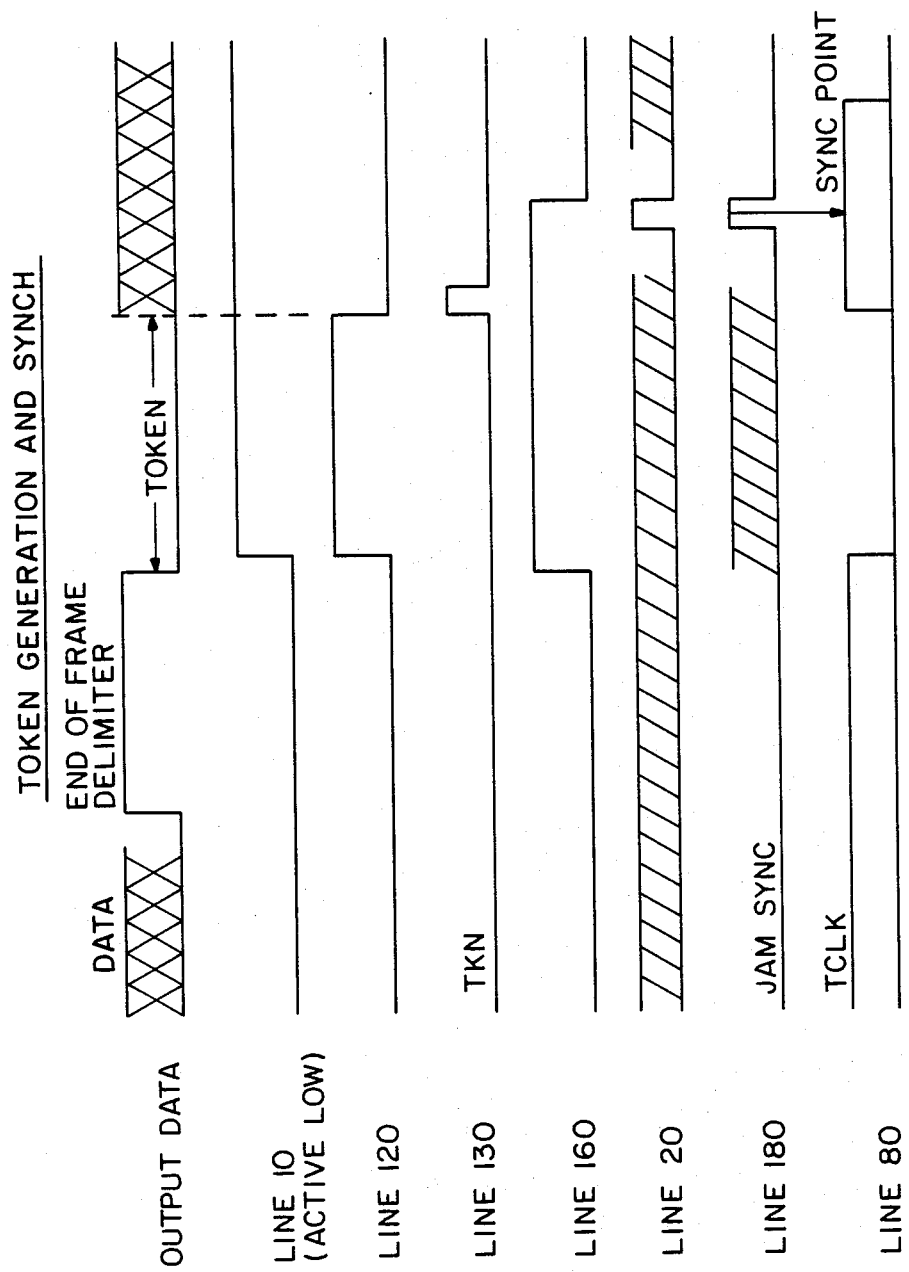
FIG. 7 is a waveform diagram useful in explaining the operation of the circuit during token generation.

The sequence of operation described in this specification is graphically illustrated in the timing diagrams of FIGS. 7 and 8. FIG. 7 illustrates generation of a token and jam syncing after a station has finished transmitting. The token is generated, the $\overline{RTS}$ signal goes inactive (line 10), resulting in setting the flipflop (line 160) thereby arming the jam sync gate. When the next sync pulse comes in (line 20), a jam sync pulse is produced (line 180).

With reference to FIG. 8, token detection and synchronization are similarly illustrated. The input data is received and, when a token is recognized by the circuit of FIG. 4, line 140 accesses gate 14 and sets flipflop 15 (line 160). This arms the jam sync circuit and when the next sync pulse on line 20 is received the jam sync is initiated.

While we have shown and described embodiments of this invention in some detail, it will be understood that this description and illustrations are offered merely by way of example, and that the invention is to be limited in scope only by the appended claims.

We claim:

1. A method of communicating data among a plurality of stations connected in a ring network while minimizing phase jitter and phase delay comprising the steps of:
    (a) providing each station in the ring with a receive clock for sampling incoming signals including data and a transmit clock for permitting transmission of signals including data to the next station in the ring;
    (b) coupling the receive and transmit clocks when a station is not transmitting to maintain approximately the same frequency for the transmit clock as the receive clock;
    (c) decoupling a station's transmit clock from its receive clock during transmission of data whereby the transmission occurs at the fundamental frequency of the transmit clock;
    (d) causing a station which has finished transmitting data to generate and transmit a phase delay identifier to the next station in the ring;
    (e) causing stations which are not transmitting to detect and retransmit said phase delay identifier to the next station in the ring; and
    (f) causing each station, upon detecting said identifier when not intending to transmit or upon regeneration of the identifier when transmitting, to jam sync its transmit clock and receive clock to the next detected transition in the incoming signals,
    thereby re-establishing the coupling of step (b) in the station which has finished transmitting and whereby residual phase delay is passed with the identifier from station to station until it is blocked by step (c) when a subsequent station initiates a new transmission.

2. A method of communicating data among a plurality of stations connected in a ring network utilizing a token passing protocol while minimizing phase jitter and phase delay comprising the steps of:
    (a) providing each station in the ring with a receive clock for sampling incoming signals including data and a transmit clock for permitting transmission of signals including data to the next station in the ring;
    (b) coupling the receive and transmit clocks when a station is not transmitting to maintain approximately the same frequency for the transmit clock as the receive clock;
    (c) permitting a station to transmit signals onto the network only after receipt of a token;
    (d) decoupling a station's transmit clock from its recieve clock during transmission of data whereby the transmission occurs at the fundamental frequency of the transmit clock;
    (e) causing a station which has finished transmitting data to regenerate and transmit the token to the next station in the ring;
    (f) causing a station which is not transmitting to detect and transmit the token to the next station in the ring; and
    (g) causing each station, upon detecting a token when not intending to transmit or upon regeneration of the token when transmitting, to jam sync its transmit clock and receive clock to the next transition detected in the incoming signals,
    thereby re-establishing the coupling of step (b) in the station that has finished transmitting and whereby residual phase delay is passed with the token from station to station until it is blocked by step (d) when a subsequent station initiates a new transmission.

3. The method of claim 2 wherein step (b) includes the substeps of comparing the frequency of the transmit clock with the frequency of the receive clock and slowly changing the transmit clock frequency to match the receive clock frequency.

4. A circuit for permitting communication of data between a plurality of stations connected in a ring network utilizing a token passing protocol which minimizes the effect of phase jitter and phase delay, said circuit being provided for each station in the ring and comprising:
    (a) a receive clock for sampling incoming signals including data;
    (b) a transmit clock for permitting transmission of signals including data to the next station in the ring;
    (c) means for coupling the receive and transmit clocks, when a station is not transmitting, to maintain approximately the same frequency for the transmit clock as the receive clock;

(d) means for decoupling the transmit clock from the receive clock during transmission of data whereby the transmission occurs at the fundamental frequency of the transmit clock;

(e) means for detecting and transmitting a token to the next station in the ring when not transmitting;

(f) means for regenerating and transmitting the token to the next station in the ring after transmission of data; and (g) means for causing the station, upon detecting a token when not intending to transmit or upon regeneration of the token at the completion of transmission, to jam sync its transmit clock and receive clock to the next transition detected in the incoming data, thereby to re-establish the coupling of said clocks in the station that has finished transmitting, residual phase delay being passed with the token from station to station until it is blocked by the decoupling means of a subsequent station which initiates a new transmission.

5. A circuit according to claim 4 wherein said circuit further includes means for receiving said incoming signals, said receiving means being sampled by said receive clock.

6. A circuit according to claim 4 wherein said transmit clock includes a phase locked loop (PLL) circuit having a voltage controlled oscillator (VCO), the output of the VCO is used to produce the transmit clock signal.

7. The circuit according to claim 6 wherein the means for coupling includes gate means for selectively providing the receive clock signals to the PLL, the PLL comparing the frequency of the receive clock signals with that of the transmit clock signals and slowly adjusting its VCO to produce approximately the same frequency for the transmit clock.

8. The circuit according to claim 4 wherein said means for detecting and transmitting a token includes a counter chain, the output of which indicates the receipt of a token.

9. The circuit according to claim 4 wherein said transmit clock includes:

(a) a PLL circuit having a voltage controlled oscillator (VCO), (b) a resettable circuit receiving the output of said VCO, the output of the resettable circuit constituting the transmit clock signal.

10. The circuit according to claim 9 wherein said means for causing a jam sync includes gate means for resetting said resettable circuit, when enabled, to re-establish synchronism between the receive and transmit clock signals and the next transition detected in the incoming signals.

11. The circuit according to claim 9 wherein said resettable circuit is a divider circuit.

* * * * *